United States Patent Office 3,715,866
Patented Feb. 13, 1973

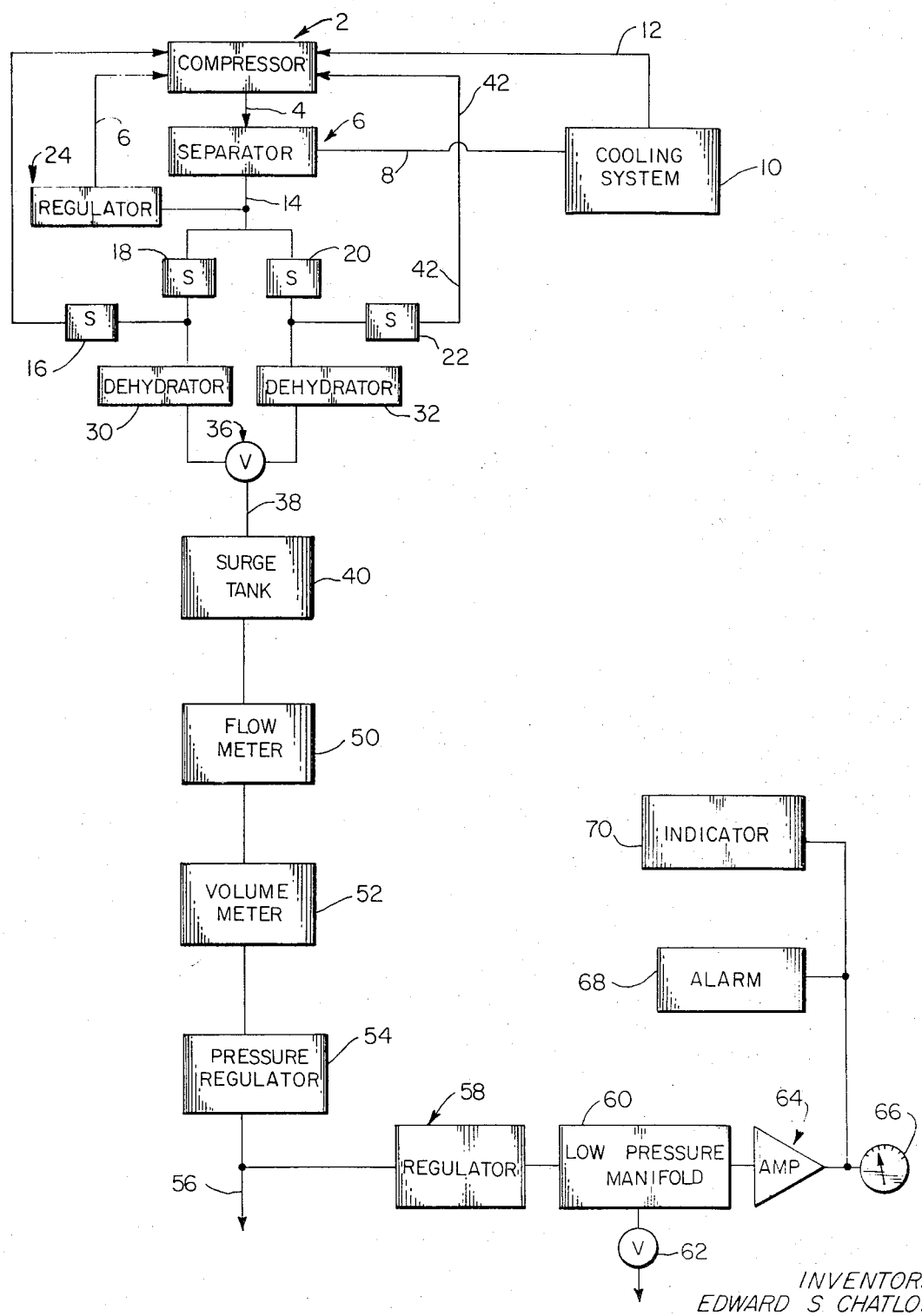

3,715,866
DRY AIR SYSTEM
Edward S. Chatlos, Morristown, Paul G. K. Schroeder, Sparta, and Clarence O. Prinkey, Caldwell, N.J., assignors to Chatlos Systems, Inc., Hanover, N.J.
Filed Apr. 30, 1970, Ser. No. 33,288
Int. Cl. B01d 53/04
U.S. Cl. 55—179
2 Claims

ABSTRACT OF THE DISCLOSURE

An improvement in dry air systems is provided by utilizing flow rate and volume indicators on the output side of a surge tank so as to minimize pulsating action during transition from one de-hydration tower to the other in the drying portion of the system. Moreover, humidity indication means are incorporated to signal the differential trend in condition as well as an alarm condition.

BACKGROUND OF THE INVENTION

The present invention relates to dry air systems of the type which are conventionally used for purposes of feeding compressed dry air to cable housings such as power cable housings, telephone cable housings, and the like.

For some time past, it has been conventional in many instances to utilize a dry air system which incorporates an oilless-type compressor that is motor driven. Such compressor conventionally utilizes a water input and produces an output comprising compressed air in water. Such output is then fed to one or more separators whereupon the water is separated from the air in general, but the air retains a high humidity. The air is then passed through a de-hydration tower, containing a desiccant material, such as activated alumina, silica gel, anhydrous calcium sulfate and the like, so as to dry the air and the output of the tower is considered the "dry air." As is well known in the art, that such chemical materials remove water vapor from air or a gas passing through same. Commonly, the de-hydration towers are provided in pairs so that as one de-hydration tower becomes saturated with water and/or less effective in taking water out of the air passing therethrough, the air can be sent through the alternate de-hydration tower. Moreover, in at least one known type of prior system, a valving arrangement is incorporated so that a portion of the dry air leaving one de-hydration tower is directed through the alternate de-hydration tower to dry the same, and then when the alternate tower is dry, a portion of the output therefrom is directed through the other de-hydration tower to dry that tower.

It is in a system of the above-described type incorporating the alternate de-hydrating tower that the present invention finds particular utility. Specifically, when a transition is made from one de-hydration tower to the other, there is inherently some type of pulsating action in the output due to the switching. Commonly, a surge tank is incorporated which tends to compensate for, or minimize the pulsations during this transition, but even the best surge tanks are not effective to substantially eliminate the pulsations.

Moreover, with the pulsation during the transition, the effectiveness of flow indicators such as rate indicators and/or volume indicators is minimized.

BRIEF DESCRIPTION OF THE PRESENT INVENTION

The present invention is directed to an improved arrangement which minimizes the pulsation during transition from one de-hydration tower to another in a dry air system of the above-described type and which further permits the effective and convenient utilization of both a flow rate indicator and a flow volume indicator.

Specifically, one of the more significant objects of the present invention is to provide an improvement in dry air systems incorporating alternate de-hydration towers which improvement utilizes series flow through a surge tank, rather than a parallel surge tank connection and which further contemplates utilizing both a flow rate indicator and a flow volume indicator on the output side of the surge tank. Consistent with the invention, pulsations in the line resulting from transition from one de-hydration tower to the other de-hydration tower are minimized, and moreover the output is controllable to the extent that someone utilizing the system can determine the extent of full load and the volume delivered.

By virtue of the controls provided on the system, as aforesaid, the system is rendered not only capable of supplying dry air such as needed for a cable means, but also dry air for use in a controlled environment such as an operating room and/or dry air such as particularly useful in driving power-driven medical equipment such as the more modern forms of dentist drills.

The invention will be better understood, and objects other than those specifically set forth above will become apparent when consideration is given to the following detailed description. Such description makes reference to the annexed drawing which constitutes a flow chart of a system constructed in accordance herewith.

If reference is now made to such drawing, it will be noted that the numeral 2 has been utilized to designate a compressor. This compressor is of the centrifugal, water seal oilless type, and as conventional with this type of arrangement, such compressor has an input of both air and water and serves to give an output as indicated by the arrow 4 which comprises compressed air in water. In a separator 6 of any suitable configuration, but preferably of the cyclone-tangential input type, water is generally separated from the air and fed out through the line 8 to a cooling system 10 which returns the water via the line 12 to the compressor 2. This cooling system arrangement is conventional for this type of system.

The air which leaves the separator 6 travels via the line 14 to a pair of solenoid operated valves 18 and 20. Moreover, such air which still has a substantial water content therein, feeds in parallel through a pressure regulator 24 that passes the excess air to maintain a set pressure via the line 16 back to the compressor 2.

The solenoid valve 18 is coupled to a de-hydration tower 30, whereas the solenoid valve 20 is coupled to a de-hydration tower 32. Additionally, solenoid operated valves 16 and 22 respectively provide selective return flow of air from the de-hydration towers 30 and 32 to the compressor 2. Assuming for the moment that the de-hydration tower 30 is the one in operation, then the solenoid valve 16 would be closed and the solenoid valve 18 open, so that the flow of the air from the line 14 is through the solenoid valve 18 and the de-hydration tower 30 to a valving system of check valves 36. The valving system 36 serves to pass a substantial part of the air via the line 38 to a surge tank 40. However, the valving system 36 diverts a portion of the air rearwardly through the de-hydration tower 32, and in this instance, the solenoid valve 22 is open so that the output therefrom travels back via the line 42 to the compressor 2. In the alternate operation, the solenoid valve 16 would be open, the solenoid valve 18 closed, the solenoid valve 20 open, and the solenoid valve 22 closed so that the air from the line 14 would pass through the solenoid valve 20 and the de-hydration tower 32 to the line 38, with a portion being diverted by the valving system 36 rearwardly through the de-hydration tower 30 and solenoid 16 for return to the compressor 2.

As should be apparent, one de-hydration tower is used at a time, and the one being utilized serves to dry the air that reaches the same so that the output is dry rather than highly humid. During the time that one de-hydration tower is being so utilized, the other de-hydration tower is being dried by that part of the output from the utilized dehydration tower which is diverted for drying purposes.

During the transition from one de-hydration tower to the other, there is inherently a break in the air supply, and it is this break in the air supply which causes the pulsation referred to above. Now, consistent with the present invention, these pulsations are minimized.

It will be noted from the flow diagram that the air passes through the surge tank 40 and into a flow meter 50 and then from the flow meter 50 to a volume meter 52 before reaching a pressure regulator 54 and traveling to the output via line 56. It will be appreciated that the pressure regulators 24, 54 and 58 (hereinafter disclosed) are of conventional construction and need not be further described. In regard to meters 50 and 52, meter 50 is a flow meter that has been calibrated to read 0–100% flow capacity and compensated for use in a fixed operating pressure of 24 pounds (normal operating pressure of centrifugal compressor for such systems herein described).

The surge tank 40 is of conventional design, but it is employed in the system, as indicated, in a somewhat unconventional manner because the flow is through the surge tank rather than having the surge tank merely coupled in parallel to the line. The flow meter 50 is a meter adapted to give an instantaneous flow therethrough. The dry air leaving the de-hydration tower 30 or 32 in operation thus travels through the surge tank 40 and the flow meter 50. To understand the specific operation of this flow meter, it is necessary to consider the relationship between the pressure regulator 24 and the pressure regulator 54. The pressure regulator 24, as previously indicated, is set at a predetermined volume so that the pressure of air in the line 14 is maintained constant. The pressure regulator 54, on the other hand, is set so as to be responsive to a minimum pressure. The pressure at the output 56 can thus vary anywhere between the pressure as regulated by the regulator 24 at a maximum and the pressure as regulated by the minimum pressure regulator 54 at a minimum.

Let us assume, for example, that the compressed air is being pumped into a single cable means which is less than the capacity of the equipment. In this instance, the flow would be above the minimum but under the maximum. Yet, without the invention, there would be no way of making this determination. With the invention, however, the flow meter 50 is so calibrated that it indicates the percent of maximum capacity. In other words, for a full output, this meter is calibrated to 100% and then calibrated down to 0 for the minimum. As more and more of the capacity of the machine is utilized, then more and more air flows therethrough, and as a result, the flow meter reads a higher and higher value. The flow meter thus serves the useful purpose of indicating to the operator how much unused capacity his piece of equipment may have at any given time.

Equally, if not more importantly, the flow meter preferably is of the conventional type and vane-driven. Thus, as the air passes therethrough, this device serves as a means to maintain the momentum of the air flow and continue the evenness of the output thereof—i.e., it serves as a means of minimizing the pulsations of the output. Thus, in a departure from the normal system of the above-described type, the invention not only passes the air directly through the surge tank to minimize pulsations, but it provides for coupling in series with the output of the surge tank a flow meter which further minimizes such pulsations and additionally indicates the capacity of the system.

Pulsations are even further minimized in the concept of the present invention by additionally incorporating a volume meter, again preferably of the vane-driven type. This volume meter serves to indicate the volume of air that has passed through the line during any given period of time. The volume indicator further tends to minimize the pulsations while simultaneously giving a desirable indication.

Appreciating the structural aspects and functions of the improvement made hereby, it should be apparent that the present system affords substantial advantage over prior systems which had undue pulsations in the line and no indication of capacities. For example, with a mere double tower system, as one switched from one de-hydration tower to the other, there was a pulsation in the line, and pulsations in the line are undesirable for obvious reasons. With the invention, these pulsations are minimized, and by virtue of the equipment utilized to minimize the same, one can now tell whether or not he is running at capacity, and then if a level of operation is established, whether a line is clogged up and/or whether there is a broken line—the flow meter which is calibrated in percentage of capacity load varying downwardly with the clogged line and upwardly with the broken line. This provides a means of continuously monitoring the system.

From the flow diagram, it will be noted that connected in parallel to the output line is a pressure regulator 58 with a low pressure manifold 60 in series therewith. The low pressure manifold feeds outwardly through a check valve 62 providing a low pressure outlet and thus permitting one to bleed a small sample from the output line 66 if desired. This bleed can be regulated so as to be offset by suitable calibration in the flow meter and volume meter. Even so, the low pressure manifold has therein a sensing means, not shown, which is electrically responsive to variations in humidity. The output of such sensing means which can be of conventional design, feeds to an amplifier 64 that in turn feeds to a meter 66, alarm 68 and indicator 70. The meter 66 permits one to determine the level of humidity, whereas the alarm 68 signals that there is an alarm condition, as does the indicator 70.

By constantly monitoring the meter 66, one is able to determine a variation in humidity and in turn proper operation of the de-hydration towers. Rather than just having an alarm output on the device when the humidity reaches a given level, the utilization of an amplifier and meter affords a constant means of monitoring so as to give an indication as to whether there is sufficient variation in the system to warrant some repair, correction or the like.

It has been found, quite unexpectedly, that by utilizing an oilless-type compressor such as described above, the compression action squeezes out 95 to 98% of the bacteria in the air thus permitting the use of the machine to controllably supply, through a humidifier if desired, a controlled environment such as an operating room. Essentially, the water washes the inlet air and the heat sterilizes such air during the operation of the compressor. As a result, a system such as suggested herein is not only usable for a controlled environment, such as an operating room, but additionally, is very desirable where dry air is important, as for example, with high-speed dentist drills. The system hereof could be employed in a dental laboratory and utilized to supply a plurality of such high-speed drills simultaneously thereby minimizing the cost of this relatively expensive equipment.

After reading the foregoing detailed description of the invention and its application, one should understand that the utilization of a series arrangement of surge tank flow meter and volume meter on the output side of the de-hydration columns serves as a structural means of minimizing pulsations and additionally results in the employment of a technique for minimizing the pulsations and giving indications of system operation. In this latter regard, the method hereof contemplates passing the dried output air through a confined area providing a surge section, through an area for determining the rate of flow and through an area for determining the volume of flow while maintaining the inertia of the flow particularly in the latter two areas.

Having now described a particular embodiment of the invention, it should be apparent that the objects set forth at the outset of the present specification have been successfully achieved. Accordingly, what is claimed is:

1. The invention as defined in claim 2, further comprising a low pressure manifold connected in parallel to the flow line downstream of said flow meter means, said volume meter means and said second pressure regulating means and upstream of said outlet means, and including sensing means to provide an output indication of the humidity in the system.

2. A system for supplying dry air comprising: compressor means, a plurality of de-hydration tower means having regenerative desiccant material for removal of water vapor from the air, a first pair of valve means for selectively connecting alternate de-hydration tower means to said compressor means and disconnecting the remainder of said de-hydration tower means therefrom, outlet means communicating with each of said de-hydration tower means through a valving system, a common throughflow surge tank means in the flow line intermediate said valving system and said outlet means, a second pair of valve means for selectively providing return flow of air from said remainder of said plurality of de-hydration tower means to said compressor means, first pressure regulating means in the flow line intermediate said first pair of valve means and said compressor means and second pressure regulating means in the flow line intermediate said surge tank means and said outlet means, and series flow through flow meter means and volume meter means in the flow line intermediate said surge tank means and outlet means for providing a percent readout at pressure of capacity load; said valving system serving to selectively divert a portion of the dry air from one of said plurality of de-hydration tower means to the remainder of said de-hydration tower means and to said compressor means through flow lines connecting said second pair of valve means intermediate said compressor means and said de-hydration tower means, thereby enabling a saturated de-hydration tower means to be dried during use of a dried de-hydration tower means.

References Cited

UNITED STATES PATENTS

| | | | |
|---|---|---|---|
| 2,955,673 | 10/1960 | Kennedy et al. | 55—62 |
| 3,186,513 | 6/1965 | Dunn et al. | 415—110 |
| 3,221,476 | 12/1965 | Meyer | 55—68 |
| 3,225,516 | 12/1965 | Smith et al. | 55—62 |
| 3,280,536 | 10/1966 | Berlin | 55—68 |
| 3,323,291 | 6/1967 | Kern | 55—179 |
| 3,399,510 | 9/1968 | Kauer, Jr. et al. | 55—33 |
| 3,448,561 | 6/1969 | Seibert et al. | 55—33 |
| 3,498,025 | 3/1970 | Bednarski | 55—33 |

BERNARD NOZICK, Primary Examiner

U.S. Cl. X.R.
55—270, 275, 316

PO-1050
(5/69)

UNITED STATES PATENT OFFICE
CERTIFICATE OF CORRECTION

Patent No. 3,715,866          Dated February 13, 1973

Inventor(s) Edward S. Chatlos, Paul G.K. Schroeder & Clarence O. Prinkey

It is certified that error appears in the above-identified patent and that said Letters Patent are hereby corrected as shown below:

On the last page of this patent in column 5, the claims should be corrected as follows:

Renumber claim "2" as claim -- 1 --.

Renumber claim "1" as claim -- 2 --; and change its dependency on line 1 from the number "2" to -- 1 --.

Signed and sealed this 3rd day of July 1973.

(SEAL)
Attest:

EDWARD M. FLETCHER, JR.                Rene Tegtmeyer
Attesting Officer                       Acting Commissioner of Patents